United States Patent [19]
Petit

[11] Patent Number: 6,010,556
[45] Date of Patent: Jan. 4, 2000

[54] PROCESS FOR SEPARATING A GAS MIXTURE BY PRESSURE SWING ADSORPTION

[75] Inventor: Pierre Petit, Verrieres le Buisson, France

[73] Assignee: L'Air Liquide, Societe Anonyme Pour L'Exploitation des Procedes Georges Claude, Paris Cedex, France

[21] Appl. No.: 09/109,270

[22] Filed: Jul. 2, 1998

[30]    Foreign Application Priority Data

Jul. 9, 1997 [FR] France .................................. 97 08724

[51] Int. Cl.⁷ ............................................... B01D 53/053
[52] U.S. Cl. .................................. 95/98; 95/101; 95/105; 95/130
[58] Field of Search .................. 95/96–98, 100–105, 95/130

[56]                References Cited

U.S. PATENT DOCUMENTS

| | | | |
|---|---|---|---|
| 3,176,444 | 4/1965 | Kiyonaga | 95/97 X |
| 3,430,418 | 3/1969 | Wagner | 95/100 |
| 3,788,036 | 1/1974 | Lee et al. | 96/130 X |
| 4,461,630 | 7/1984 | Cassidy et al. | 95/100 |
| 4,482,361 | 11/1984 | Whysall | 95/100 |
| 4,512,779 | 4/1985 | Hay | 95/100 |
| 4,981,499 | 1/1991 | Hay et al. | 95/100 |
| 5,015,272 | 5/1991 | Okada et al. | 95/100 X |
| 5,032,150 | 7/1991 | Knaebel | 95/130 X |
| 5,248,322 | 9/1993 | Kumar | 95/130 X |
| 5,250,088 | 10/1993 | Yamaguchi et al. | 95/98 |
| 5,370,728 | 12/1994 | LaSala et al. | 95/101 |
| 5,518,526 | 5/1996 | Baksh et al. | 95/130 X |
| 5,565,018 | 10/1996 | Baksh et al. | 95/100 |
| 5,620,501 | 4/1997 | Tamhankar et al. | 95/96 X |
| 5,658,371 | 8/1997 | Smolarek et al. | 95/130 X |
| 5,679,134 | 10/1997 | Brugerolle et al. | 95/130 X |
| 5,702,504 | 12/1997 | Schaub et al. | 95/130 X |
| 5,713,984 | 2/1998 | Monnot et al. | 95/100 |
| 5,735,938 | 4/1998 | Baksh et al. | 95/101 |
| 5,772,737 | 6/1998 | Andreani et al. | 95/130 X |
| 5,846,294 | 12/1998 | Doong | 95/130 X |
| 5,876,485 | 3/1999 | Andreani | 95/130 X |
| 5,882,380 | 3/1999 | Sircar | 95/130 X |

FOREIGN PATENT DOCUMENTS 0 689 862  1/1996  European Pat. Off. .
0 743 087  11/1996  European Pat. Off. .

Primary Examiner—Robert Spitzer
Attorney, Agent, or Firm—Young & Thompson

[57]                ABSTRACT

In a process for separating a gas mixture in a pressure swing adsorption device comprising an adsorber, two outlet vessels and a rotary machine at the inlet, the rotation of the rotary machine is reversed during the first depressurization step (c-d) then during the first repressurization step (g-h), so that these first steps are each broken down into two sub-steps in which the inlet for the adsorber successively experiences two opposite flows, whereas the outlet of the adsorber experiences a flow, respectively leaving or entering, of constant direction. The process is particularly useful in the production of oxygen from air.

14 Claims, 2 Drawing Sheets

PROCESS FOR SEPARATING A GAS MIXTURE BY PRESSURE SWING ADSORPTION

FIELD OF THE INVENTION

The present invention relates to processes for separating gas mixtures by pressure swing adsorption in adsorption devices comprising at least one adsorber having an inlet that can be connected to a rotary machine and an outlet that can be connected to a production gas vessel and a cycle vessel, comprising, successively in a cycle, a production phase, a regeneration phase and a repressurization phase.

BACKGROUND OF THE INVENTION

A process of this type is described in the document EP-A-0 743 087 in the name of the Assignee.

SUMMARY OF THE INVENTION

The object of the present invention is to provide an improved process allowing a gain in specific energy without reducing productivity.

For this purpose, according to one characteristic of the invention, the regeneration phase comprises an initial depressurization step in which the gas is extracted in co-current from the adsorber and sent to the cycle vessel and which comprises a first sub-step in which the gas mixture is sent concomitantly in co-current to the adsorber.

According to another characteristic of the invention, the repressurization phase includes an initial step of repressurizing the adsorber in counter-current with some of the gas taken from one of the vessels, comprising a first sub-step in which gas is extracted concomitantly in counter-current from the adsorber.

According to one aspect of the invention, the end of the first sub-steps corresponds to a reversal of the direction of rotation of the rotary machine, that is to say the rotational speed of the rotary machine passes through the zero as it changes from a compression mode to a suction mode, or vice versa.

BRIEF DESCRIPTION OF THE DRAWINGS

Other characteristics and advantages of the present invention will emerge from the following description, which is given by way of illustration but without implying any limitation, and is made with reference to the appended drawings, in which.

DETAILED DESCRIPTION OF THE INVENTION

Figure 1:
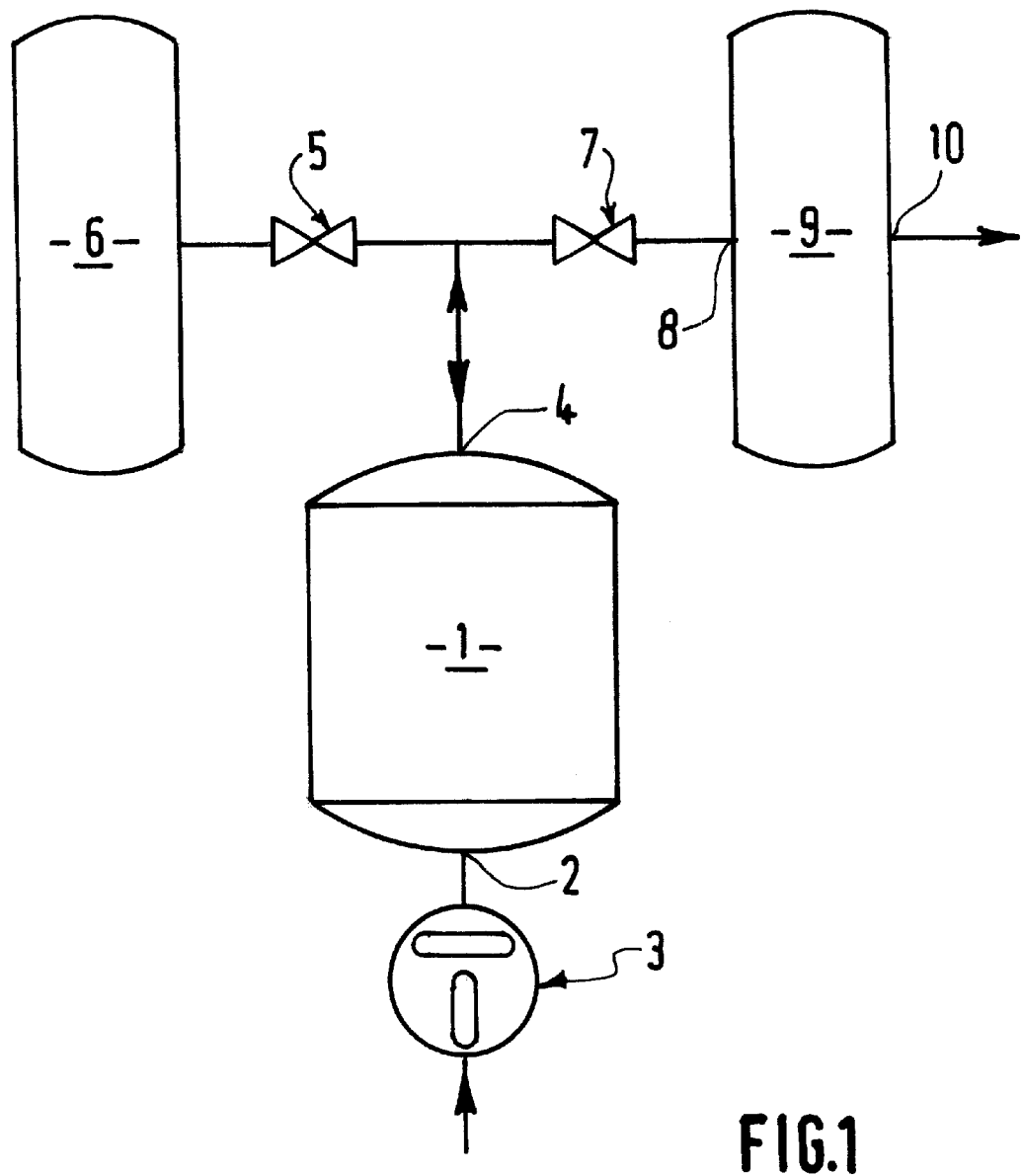
FIG. 1 is a schematic view of an adsorption device for implementing a process according to the invention.

FIG. 1 shows a device for separating gases by adsorption, of the so-called VSA type, as described in the document EP-A-0 743 087 mentioned above. In the embodiment represented by way of example, the device essentially comprises an adsorber 1, of vertical general configuration, having a return permanently connected to a reversible rotary machine 3, typically a Roots machine or a multi-lobed rotor machine.

The adsorber 1 has an outlet 4 which selectively communicates, via a valve 5, with a cycle vessel 6 and, via a valve 7, with the inlet 8 of a production gas vessel 9 which has an outlet 10 that can be connected to a user circuit.

Figure 2:
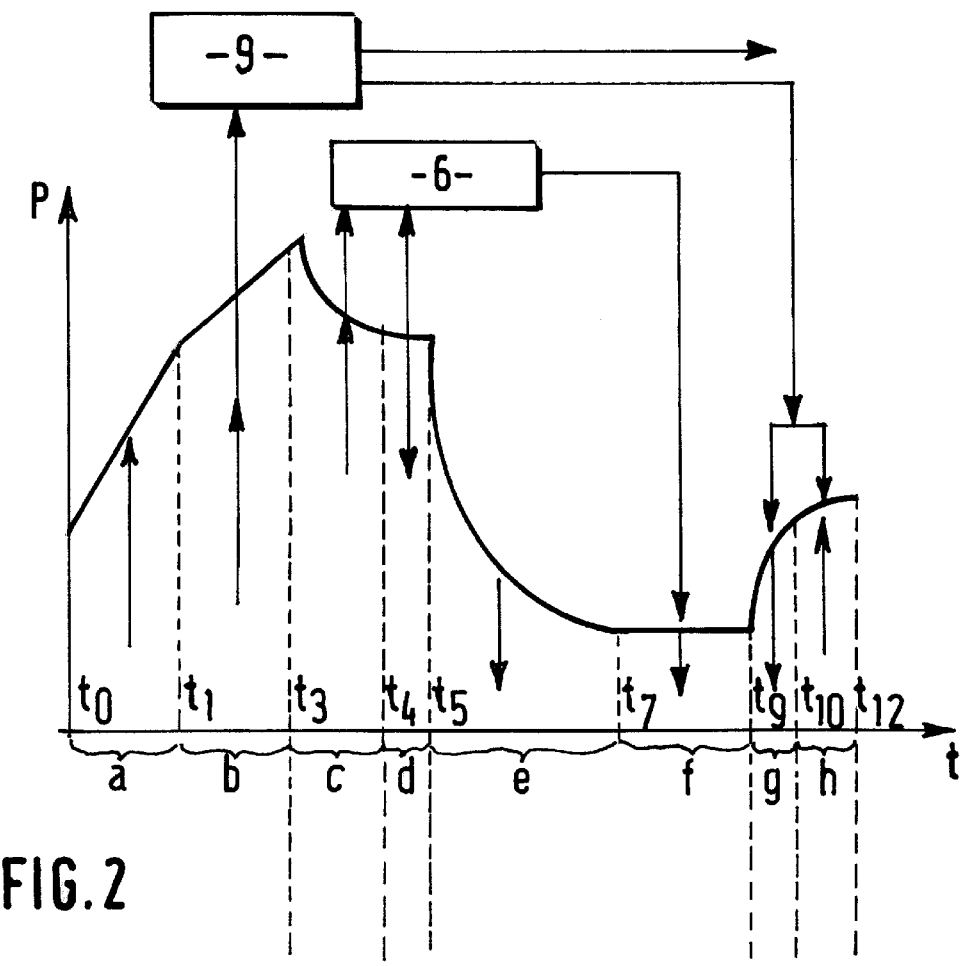
FIG. 2 schematically represents a cycle of a process according to the invention.

As represented in FIG. 2, a device according to FIG. 1 is employed using a cycle which includes the following successive steps:

a) ($t_0$–$t_1$): a step of pure repressurization by supplying the inlet 2 (in co-current) with gas mixture compressed by the machine 3 which is operating as a compressor without extracting gas through the outlet 4 (valves 5 and 7 closed)

b) ($t_1$–$t_3$): a phase of production to the cycle high pressure, in which the gas mixture to be separated continues to be introduced in co-current into the adsorber while the gas fraction not retained in the adsorber is extracted through the outlet 4 and sent to the vessel 9, the valve 7 being open c+d) ($t_3$–$t_5$) an initial depressurization step, in which the gas available in the upper part of the adsorber is extracted in co-current through the outlet 4 and sent to the vessel 6, the valve 5 being open (the valve 7 being closed)

e) ($t_5$–$t_7$): a step of pure counter-current depressurization via the inlet 2, the rotary machine 3 operating as a pump (the valves 5 and 7 being closed)

f) ($t_7$–$t_9$): an elution step continuing the previous step e) of counter-current discharge, with extra flushing of the adsorber in counter-current with gas taken from the vessel 6, the valve 5 being open g) ($t_9$–$t_{12}$): an initial repressurization step with counter-current application through the inlet 4 of production gas taken from the vessel 9, the valve 7 being open.

Figure 3:
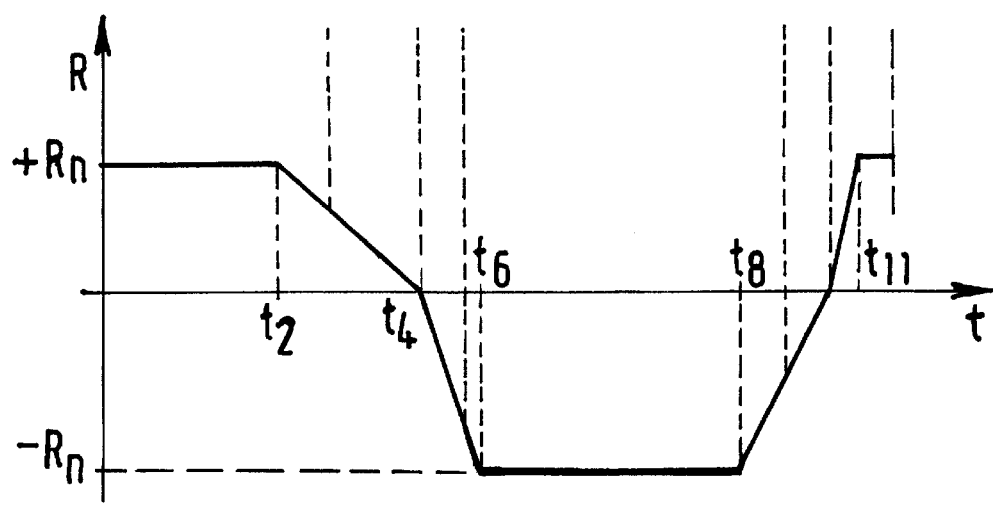
FIG. 3 is a diagram, correlated with the one in FIG. 2, showing the variations in the rotational speed of the rotary machine during the phases of the cycle in FIG. 2.

According to one aspect of the invention, as can be seen in FIG. 3, the speed of the rotary machine 3, which is operating as a compressor, is constant (nominal speed+$R_n$) during step a) and approximately a first half of step b).

At a time $t_2$ between $t_1$ and $t_3$, the rotary machine ceases to be driven and its rotational speed decreases until a time $t_4$, between the times $t_3$ and $t_5$, that is to say during the initial depressurization step, at which the speed becomes zero. At time $t_4$, the rotary machine which is at rest is driven in the other direction so as to operate as a pump. Its rotational speed therefore increases until a time $t_6$, following the time $t_5$, that is to say at the start of the pure depressurization phase e). From this time $t_6$ until a time $t_8$, while between the times $t_7$ and $t_9$, that is to say after a first part of the elution step f), it is kept constant (nominal speed –$R_n$).

At time $t_8$, the rotary machine ceases to be driven and its rotational speed decreases to zero at a time $t_{10}$, between the times $t_9$ and $t_{12}$, that is to say during a first part of the first recompression step.

At time $t_{10}$, the rotary machine starts to be driven in the other direction, to operate again as a compressor, and its speed increases rapidly until reaching the nominal speed $R_n$, at time $t_{11}$ which still lies in the interval $t_9$–$t_{12}$, after which the rotational speed of the rotary machine is maintained until time $t_2$ as seen above.

As can be seen in FIG. 2, this sequence of driving, relaxing and re-driving the rotary machine has the effect that the first depressurization step c+d) is broken down into a first sub-step c) ($t_3$–$t_4$) in which, concomitantly with the co-current extraction of the unretained gas fraction to the cycle vessel 6, the gas mixture to be separated continues to be introduced in co-current, with a flow rate decreasing to zero at time $t_4$, and into a second sub-step d) ($t_4$–$t_5$) in which concomitantly with the co-current extraction, and with the rotary machine having started to rotate as a pump, a counter-current extraction takes place which increases progressively until time $t_5$, after which the valve 5 is closed until time $t_7$.

Similarly, the first repressurization step g-h) ($t_9$–$t_{12}$) is broken down into a first sub-step g) ($t_9$–$t_{10}$) in which, concomitantly with the counter-current introduction of production gas taken from the vessel 9, counter-current discharge takes place through the inlet 2, with a flow rate which is reduced to zero at time $t_{10}$ when, with the rotary machine being reversed and starting to operate as a compressor, the pressurization continues in a second sub-step with application, through the two ends, in counter-current of production gas taken from the vessel 9 and in co-current of gas mixture to be separated, up to full-speed operation of the rotary machine operating as a compressor until time $t_2$.

The present invention finds a particular application for the production of medium-purity oxygen from air on an adsorbent of the zeolite type. The cycle in FIG. 2 corresponds typically to a cycle lasting less than 90 seconds, typically of the order of 70 to 80 seconds, with a cycle high pressure that does not exceed $1.5 \times 10^5$ Pa and a cycle low pressure that does not exceed $0.5 \times 10^5$ Pa.

I claim:

1. Process for separating a gas mixture by pressure swing adsorption in an adsorption device comprising at least one adsorber having an inlet that can be connected to a rotary machine and an outlet that can be connected to a production gas vessel and a cycle vessel, comprising, successively in a cycle, a production phase, a regeneration phase and a repressurization phase, wherein the regeneration phase comprises an initial depressurization step during which gas is extracted co-currently from the adsorber and sent to the cycle vessel, said initial depressurization step comprising a first sub-step during which the gas mixture to be separated is simultaneously co-currently admitted to the adsorber.

2. Process according to claim 1, wherein the initial depressurization step includes a second sub-step during which gas is simultaneously extracted counter-currently from the adsorber.

3. Process according to claim 2, wherein the transition between the first and second sub-steps corresponds to a reversal of the direction of rotation of the rotary machine.

4. Process according to claim 1, wherein the repressurization phase includes an initial step of repressurizing the adsorber counter-currently with some of the gas taken from one of the vessels, comprising a first sub-step during which gas is simultaneously extracted counter-currently from the adsorber.

5. Process according to claim 4, wherein the initial repressurization step comprises a second sub-step during which the gas mixture to be separated is simultaneously sent co-currently to the adsorber.

6. Process according to claim 5, wherein the transition between the first and second repressurization sub-steps corresponds to a reversal of the direction of rotation of the rotary machine.

7. Process according to claim 6, wherein during at least the second sub-step of the initial repressurization step, the co-current repressurization gas is taken from the production gas vessel.

8. Process according to claim 1, wherein the regeneration phase includes a final step of eluting with gas taken from the cycle vessel.

9. Process according to claim 8, wherein the regeneration phase furthermore includes an intermediate step of pure counter-current depressurization of the adsorber.

10. Process according to claim 9, wherein the speed of the rotary machine is substantially constant over the majority of the intermediate depressurization step and over the start of the elution step.

11. Process according to claim 8, wherein the repressurization phase includes a step of pure co-current repressurization with some of the gas mixture to be separated.

12. Process according to claim 11, wherein the speed of the rotary machine is substantially constant during the pure repressurization step and a first part of the production phase.

13. Process according to claim 1, wherein the duration of the cycle is less than 90 seconds.

14. Process according to claim 1, wherein the gas mixture is air, and oxygen is separated from said air.

* * * * *